US010013670B2

(12) United States Patent
Coussemaeker et al.

(10) Patent No.: US 10,013,670 B2
(45) Date of Patent: Jul. 3, 2018

(54) AUTOMATIC PROFILE SELECTION ON MOBILE DEVICES

(75) Inventors: Didier Coussemaeker, Seattle, WA (US); Nicolas Mai, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/494,420

(22) Filed: Jun. 12, 2012

(65) Prior Publication Data

US 2013/0331067 A1    Dec. 12, 2013

(51) Int. Cl.
*H04W 4/02* (2018.01)
*G06Q 10/10* (2012.01)
*H04M 1/725* (2006.01)

(52) U.S. Cl.
CPC ........ *G06Q 10/10* (2013.01); *H04M 1/72569* (2013.01)

(58) Field of Classification Search
CPC ......... H04M 1/72563; H04M 1/72566; H04M 1/72569; H04M 1/72572; H04M 2250/12
USPC ......... 455/404.1, 404.2, 412.2, 414.1, 414.2, 455/456.1–457
See application file for complete search history.

(56) References Cited

U.S. PATENT DOCUMENTS

| | | | |
|---|---|---|---|
| 6,975,939 B2 * | 12/2005 | Edwards | G01C 21/26 455/456.1 |
| 6,990,333 B2 | 1/2006 | Andrew et al. | |
| 7,248,835 B2 | 7/2007 | Fan et al. | |
| 7,272,388 B2 | 9/2007 | Andrew et al. | |
| 7,529,854 B2 | 5/2009 | Parupudi et al. | |
| 2008/0189628 A1 * | 8/2008 | Liesche et al. | 715/762 |
| 2009/0132197 A1 * | 5/2009 | Rubin et al. | 702/141 |
| 2009/0170486 A1 | 7/2009 | Culbert et al. | |
| 2009/0170552 A1 * | 7/2009 | Lin | 455/550.1 |
| 2009/0252303 A1 | 10/2009 | Agarwal | |
| 2010/0004997 A1 | 1/2010 | Mehta et al. | |
| 2010/0267377 A1 | 10/2010 | Chiu et al. | |
| 2011/0045806 A1 | 2/2011 | Gupta et al. | |
| 2011/0136509 A1 * | 6/2011 | Osann, Jr. | 455/456.3 |

(Continued)

OTHER PUBLICATIONS

Zulkernain, et al., "A Mobile Intelligent Interruption Management System", In Journal of Universal Computer Science, vol. 16, No. 15, Aug. 1, 2010, pp. 2060-2080.

(Continued)

*Primary Examiner* — Erica Navar

(57) ABSTRACT

Various embodiments pertain to techniques that utilize data obtained from various sensors and sources of information on a mobile device to determine a profile to be applied to the mobile device. Data obtained from various sensors and sources of information on the mobile device can include real-time data from hardware sensors or receivers on the mobile device, local device data, and remote data available via a wireless connection. Applying the profile to the mobile device can include adjusting various parameters, such as ringtone tune, ringtone volume, call filtering, call forwarding, and message notification. In various embodiments, data is obtained and analyzed to determine a profile category for the user. In some embodiments, different types of data can be weighted differently, and data that is more personal can have a higher relative importance when compared to data that is less personal.

20 Claims, 5 Drawing Sheets

(56) References Cited

U.S. PATENT DOCUMENTS

| | | | |
|---|---|---|---|
| 2011/0167357 A1* | 7/2011 | Benjamin | H04M 1/72572 |
| | | | 715/753 |
| 2013/0150117 A1* | 6/2013 | Rodriguez et al. | 455/550.1 |
| 2015/0072663 A1* | 3/2015 | Chande | G06Q 10/10 |
| | | | 455/414.1 |

OTHER PUBLICATIONS

Bartolomeo, et al., "Personalization and User Profile Management", In International Journal of Interactive Mobile Technologies, vol. 2, No. 4, Oct. 2008, pp. 25-29.

"Best Profiles for Nokia 9500/9300(i) for Symbian", Retrieved on: Jan. 18, 2012, Available at: http://download.cnet.com/Best-Profiles-for-Nokia-9500-9300-i/3000-2056_4-10935607.html.

* cited by examiner

AUTOMATIC PROFILE SELECTION ON MOBILE DEVICES

BACKGROUND

Mobile devices, such as smartphones, personal digital assistants (PDAs), and tablet devices, can provide a set of usage profiles that define default actions triggered by various events (e.g., phone calls, email messages, text messages, calendar reminders, low battery detection, or the like). In particular, the usage profiles can define how notifications for various events are presented to a user (e.g., audio, visual, vibration, etc.) and can attempt to balance between a notification so discrete it is easily missed or ignored by a user and a notification so effective it becomes annoying or disturbing to a user or others.

In some instances, profile selections are linked to a user's calendar to enable the profile to be changed according to time-based rules or activities recorded in the calendar. For example, the profile can be changed to provide silent notifications to a user during time when a meeting is recorded on the user's calendar. However, this solution uses only one type of data available to the device, and can be inaccurate when the user's situation is not synchronized with the calendar.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments pertain to techniques that utilize data obtained from various sensors and sources of information on a mobile device to determine a profile to be applied to the mobile device. Data obtained from various sensors and sources of information on the mobile device can include real-time data from hardware sensors or receivers on the mobile device, local device data, and remote data available via a wireless connection. Applying the profile to the mobile device can include adjusting various parameters, such as ringtone tune, ringtone volume, call filtering, call forwarding, and message notification. In some embodiments, applying the profile to the mobile device can include operating the device in "airplane" mode.

In various embodiments, data is obtained and analyzed to determine a profile category for the user. In some embodiments, different types of data can be weighted differently, and data that is more personal (e.g., information on a user's calendar) can have a higher relative importance when compared to data that is less personal (e.g., data obtained via an ambient light sensor on the mobile device). Each profile category can have an associated default profile. The default profile can include settings for various parameters. In some embodiments, a user can override the default profile or one or more settings within the profile.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments pertain to techniques that utilize data obtained from various sensors and sources of information on a mobile device to determine a profile to be applied to the mobile device. Data obtained from various sensors and sources of information on the mobile device can include real-time data from hardware sensors or receivers on the mobile device, local device data, and remote data available via a wireless connection. Applying the profile to the mobile device can include adjusting various parameters, such as ringtone tune, ringtone volume, call filtering, call forwarding, and message notification. In some embodiments, applying the profile to the mobile device can include operating the device in "airplane" mode.

In various embodiments, data is obtained and analyzed to determine a profile category for the user. In some embodiments, different types of data can be weighted differently, and data that is more personal (e.g., information on a user's calendar) can have a higher relative importance when compared to data that is less personal (e.g., data obtained via an ambient light sensor on the mobile device). Each profile category can have an associated default profile. The default profile can include settings for various parameters. In some embodiments, a user can override the default profile or one or more settings within the profile.

In the discussion that follows, a section entitled "Example Operating Environment" describes an operating environment in accordance with one or more embodiments. Next, a section entitled "Example Methods" describes various techniques that employ data obtained from various sensors and sources of information on a mobile device to determine a profile to be applied to the mobile device. A section entitled "Example Implementations" describes various example implementations of employing data obtained to determine a profile to be applied to the mobile device. Finally, a section entitled "Example Device" describes an example device that can be used to implement one or more embodiments.

Consider, now, an example operating environment in accordance with one or more embodiments.

Example Operating Environment

Figure 1:
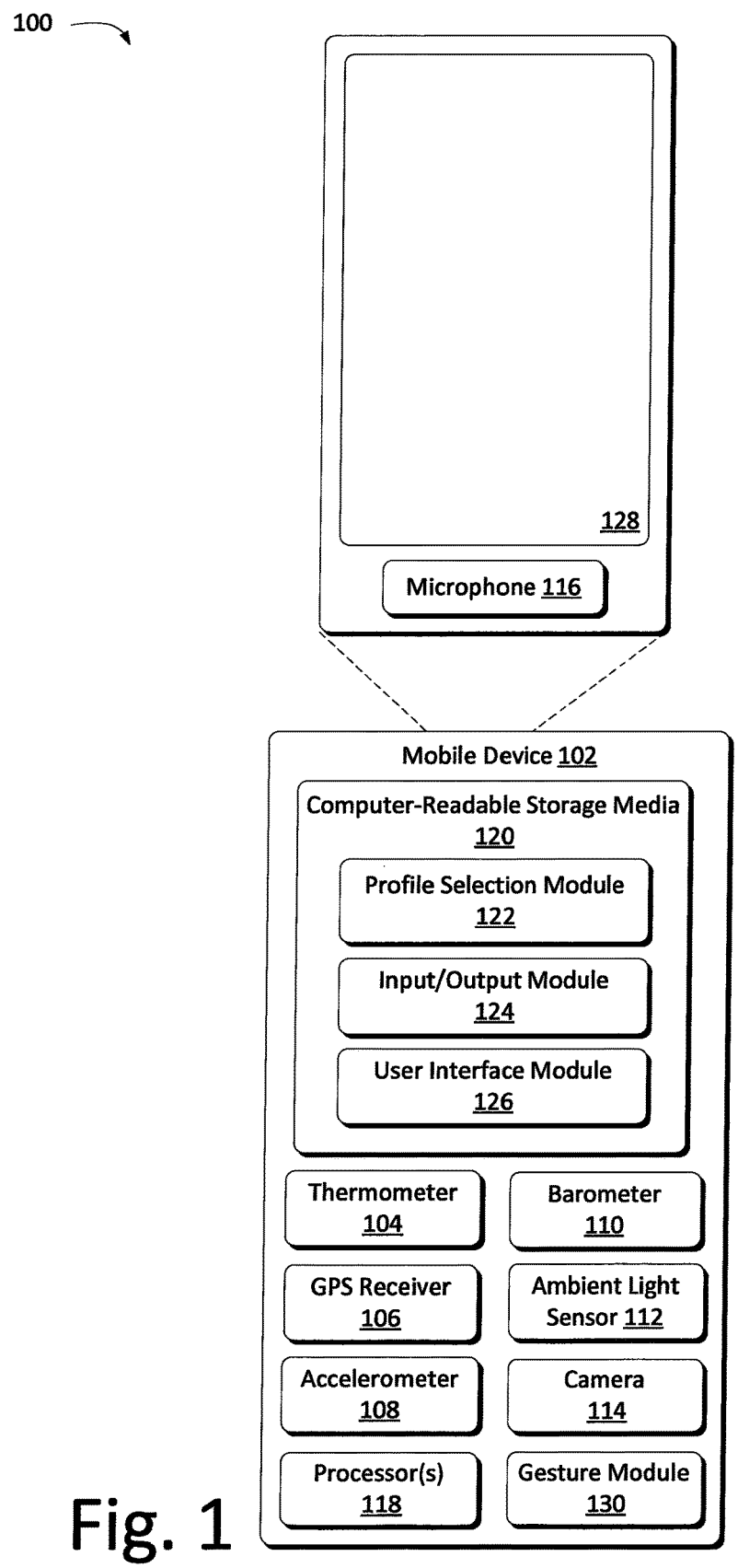
FIG. 1 depicts an example operating environment in accordance with one or more embodiments.

FIG. 1 is an illustration of an example environment 100 in accordance with one or more embodiments. Environment 100 includes a handheld, mobile device 102 that is equipped with a variety of sensors. In various embodiments, one or more sensors provide information that is utilized to select a profile for the mobile device. The sensors can include, by way of example and not limitation, various hardware sensors such as a thermometer 104, a global positioning system (GPS) receiver 106, an accelerometer 108, a barometer 110, an ambient light sensor 112, a camera 114 and a microphone 116. In some embodiments, sensors can be Bluetooth®-enabled devices rather than being integrated into the mobile device 102 (Bluetooth® is a registered trademark of Bluetooth Sig, Inc.). Other sensors, such as a gyroscope or another type of sensor, can be utilized without departing from the spirit and scope of the claimed subject matter.

Thermometer 104 is configured to detect an ambient temperature for an environment surrounding the mobile device. GPS receiver 106 is configured to determine a location of the mobile device. In some embodiments, other location methods can be used to determine or refine the location of the mobile device. The location system can also determine if a speed at which the device is being moved is comparable to that of a human activity (e.g., walking or running) or is comparable to another form of transport (e.g., train, car, etc.). Accelerometer 108 is configured to measure acceleration or movement of the mobile device 102. For example, accelerometer 108 can collect acceleration information and determine an orientation in which mobile device 102 is being held (e.g., portrait or landscape).

Barometer 110 is configured to detect atmospheric pressure. In some embodiments, the use of a barometer 110 can assist the GPS receiver 106 with determining the location of the mobile device 102. Ambient light sensor 112 is configured to detect a quality and intensity of light around the mobile device 102. Camera 114 is configured to capture and process images. In various embodiments, the camera 114 is configured to scan a visual indicator (e.g., a barcode, QR-code, or other two-dimensional barcode), from which information regarding the environment can be obtained. Mobile device 102 also includes a microphone 116 that is configured to capture audio information, such as from the environment around mobile device 102. In various embodiments, the various sensors work together as a group or subgroups to enable additional data or information about the environment to be collected. In some embodiments, different or additional sensors, such as an altimeter, can be included on mobile device 102.

In various embodiments, mobile device 102 is configured to obtain user consent before collection of information from the sensors. Consent can be opt-in consent (e.g., the user takes an affirmative action before information from the sensors is collected for analysis) or opt-out consent (e.g., the mobile device provides a notification to the user indicative that information will be collected and the user can take an affirmative action to prevent the collection and analysis of information).

In the illustrated and described embodiment, mobile device 102 includes one or more processors 118 and computer-readable storage media 120. Computer-readable storage media 120 can include various software executable modules, including profile selection module 122, input/output module 124, and a user interface module 126. In this particular example, profile selection module 122 is configured to analyze data collected by sensors and select a profile (e.g., a sound profile) for the device.

Input/output module 124 is configured to enable the mobile device 102 to receive communications and data from, and transmit communications and data to, other devices, such as mobile phones, computers, and the like. The input/output module 124 can include a variety of functionality, such as functionality to make and receive telephone calls, form short message service (SMS) text messages, multimedia messaging service (MMS) messages, email messages, status updates to be communicated to a social network service, and so on.

The user interface module 126 is configured to manage user interfaces associated with executable modules that execute on the device. In the illustrated and described embodiment, user interface module 126 can, under the influence of profile selection module 122, cause informational details regarding the selected profile to be presented to a user along with tools that can enable a user to adjust the profile to achieve a desired custom profile.

Mobile device 102 also includes a display 128 disposed on the front of the device that is configured to display content. Display 128 may be used to output a variety of content, such as a caller identification (ID), contacts, images (e.g., photos), email messages, multimedia messages, Internet browsing content, game play content, music, video, and so on. In one or more embodiments, the display 128 is configured to function as an input device by incorporating touchscreen functionality, e.g., through capacitive, surface acoustic wave, resistive, optical, strain gauge, dispersive signals, acoustic pulse, and other touchscreen functionality. The touchscreen functionality (as well as other functionality such as track pads) may also be used to detect gestures or other input.

In operation, profile selection module 122 can utilize data collected from one or more sensors to select a profile for the mobile device 102. In various embodiments, profile selection module 122 can additionally or alternately consider information obtained via input/output module 124. For example, input/output module 124 can obtain information that is stored on mobile device 102, such as information contained in a user's email, short messages or text messages, a user's address book or contact list, a user's calendar, or even information transmitted from and received by the mobile device 102 via a network connection. The network connection can transmit data using various wireless protocols, such as Wi-Fi®, 2G/3G/4G cellular protocols, Bluetooth®, near field communication (NFC), or the like (Wi-Fi® is a registered trademark of Wi-Fi Alliance). Such remote data available through the network connection can include, for example, data available on websites, blogs, and social networks. In some embodiments, data from other devices, such as sensors, can be obtained via wireless protocols such as Wi-Fi®, Bluetooth®, or NFC. Other information considered by profile selection module 122 can include geographical data such as maps or points of interests, or other local data stored on mobile device 102.

Profile selection module 122 receives the data from one or more various sources and can determine a profile category for the user of the mobile device 102. In various embodiments, profile selection module 122 utilizes decision-making logic, such as a decision-making algorithm and/or a decision tree, to determine the category for the user. In some embodiments, a user can override the profile selected by the profile selection module 122. In some instances, a user's override of a default profile selection can be utilized to enhance future profile selections by the profile selection module 122, such as when the profile selection module 122 is configured to be self-learning or is operated in a self-learning mode. Additional details regarding the selection of a profile by the profile selection module and self-learning abilities are described below.

Mobile device 102 also includes a gesture module 130 that recognizes gestures that can be performed by one or more fingers, and causes operations to be performed that correspond to the gestures. The gestures may be recognized by module 130 in a variety of different ways. For example, the gesture module 130 may be configured to recognize a touch input, such as a finger of a user's hand as proximal to display 128 of the mobile device 102 using touchscreen functionality. Module 130 can be utilized to recognize single-finger gestures and bezel gestures, multiple-finger/same-hand gestures and bezel gestures, and/or multiple-finger/different-hand gestures and bezel gestures.

The mobile device 102 may also be configured to detect and differentiate between a touch input (e.g., provided by one or more fingers of the user's hand) and a stylus input (e.g., provided by a stylus). The differentiation may be performed in a variety of ways, such as by detecting an amount of the display 128 that is contacted by the finger of the user's hand versus an amount of the display 128 that is contacted by the stylus.

Thus, the gesture module 130 may support a variety of different gesture techniques through recognition and leverage of a division between stylus and touch inputs, as well as different types of touch inputs.

Figure 2:
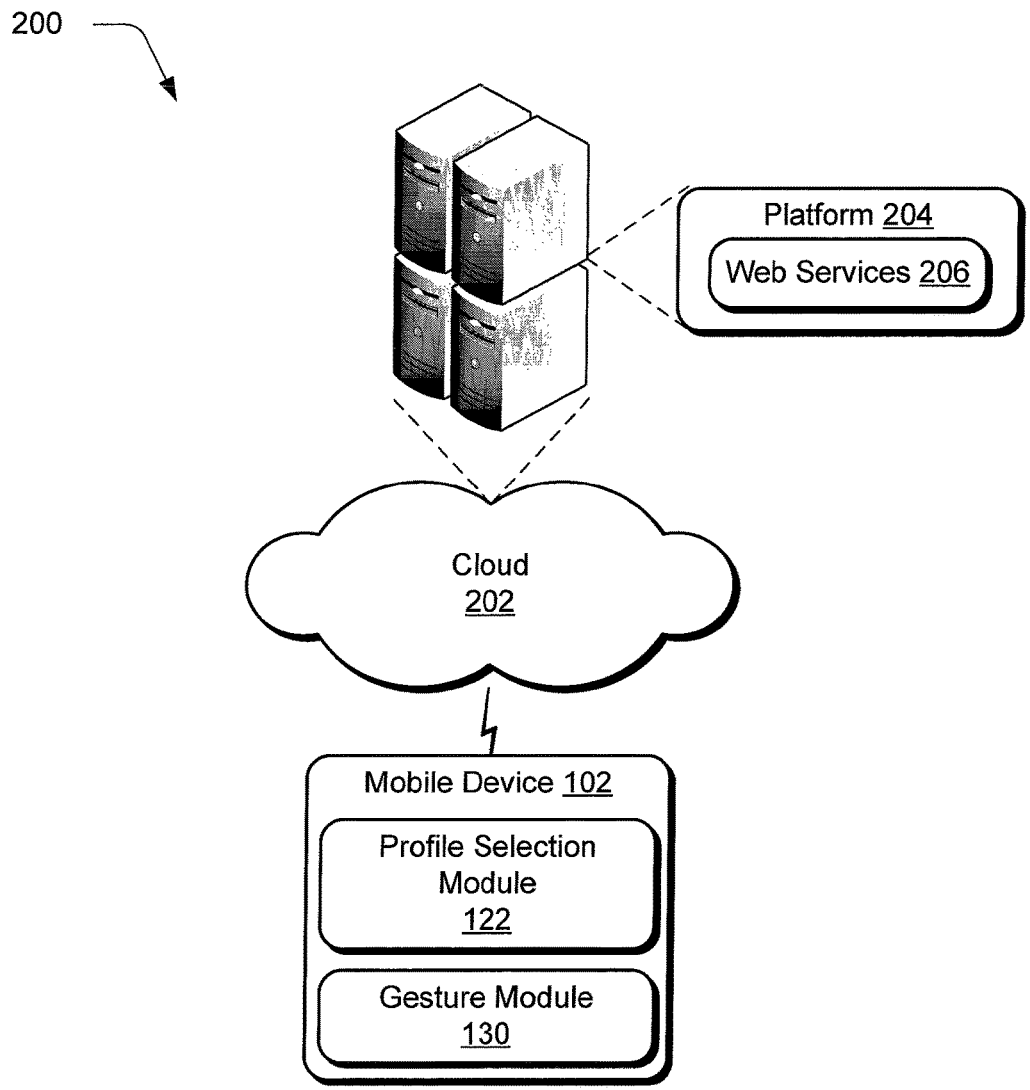
FIG. 2 illustrates an example environment where multiple devices are interconnected through a central computing device in accordance with one or more embodiments.

FIG. 2 illustrates an example system 200 showing the profile selection module 122 and gesture module 130 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices.

Cloud 202 is illustrated as including a platform 204 for web services 206. The platform 204 abstracts underlying functionality of hardware (e.g., servers) and software resources of the cloud 202 and thus may act as a "cloud operating system." For example, the platform 204 may abstract resources to connect the mobile device 102 with other computing devices. The platform 204 may also serve to abstract scaling of resources to provide a corresponding level of scale to encountered demand for the web services 206 that are implemented via the platform 204. A variety of other examples are also contemplated, such as load balancing of servers in a server farm, protection against malicious parties (e.g., spam, viruses, and other malware), and so on.

Thus, the cloud 202 is included as a part of the strategy that pertains to software and hardware resources that are made available to the mobile device 102 via the Internet or other networks. For example, an animation library may be implemented in part on the mobile device 102 as well as via a platform 204 that supports web services 206.

The gesture techniques supported by the gesture module may be detected using touchscreen functionality in the mobile device 102, or track pad functionality of a computer configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the mobile device 102 and/or the web services 206 supported by the platform 204 of the cloud 202.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

The example environment described can be appreciated with respect to the following example embodiments that employ data obtained from various sensors and sources of information on a mobile device to determine a profile to be applied to the mobile device.

Example Methods

Figure 3:
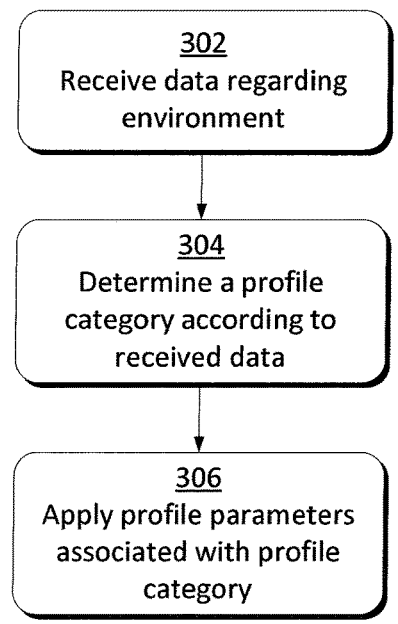
FIG. 3 illustrates an example method for employing data obtained from various sensors and sources to determine a profile to be applied to the mobile device in accordance with one or more embodiments.

FIG. 3 illustrates an example method 300 for employing data obtained from various sensors and sources to determine a profile to be applied to the mobile device in accordance with various embodiments. The method can be implemented in connection with any suitable hardware, software, firmware, or combination thereof. In at least some embodiments, the process can be implemented in software. For example, the method can be implemented by profile selection module 122.

Block 302 receives data regarding an environment in which a device is present. This can be performed in any suitable way. For example, profile selection module 122 can receive information from various hardware sensors (e.g., thermometer 104, GPS receiver 106, accelerometer 108, barometer 110, ambient light sensor 112, camera 114 and microphone 116), local device data, and/or remote data available via a network connection. Local device data can include, for example, information stored in an address book or contact list on the mobile device, information stored in a calendar stored on or accessible to the mobile device, information contained in email or short message (e.g., text message) mailboxes, and geographical data such as maps or lists of points of interest. Remote data can include, for example, data obtained from websites, blogs, social networks, positioning data (such as received information on geographic positioning using Wi-Fi or cellular tower triangulation), geographical information (e.g., maps, roads and railways database information, and/or public transportation schedules and routes), and the like.

Next, block 304 determines a profile category according to the received data. This can be performed in any suitable way. For example, profile selection module 122 can input the received data into a decision-making algorithm or use a decision tree to determine a profile category for an environment in which the device is presumed to be. In some embodiments, data received can be weighted according to its relative importance with respect to other received data. For example, data that is more personal to a user or device can be weighted so as to reflect a greater importance of that data as compared to data obtained from a social network.

Profile categories can vary depending on the particular embodiment. For example, in some embodiments there may be three or four profile categories, while other embodiments may have more profile categories each associated with various parameter configurations.

After block 304 determines the profile category, block 306 applies profile parameters associated with the profile category. This can be performed in any suitable way. For example, profile selection module 122 can cause one or more profile parameters of the mobile device to be altered. Profile parameters can include, for example, a ringtone tune, a ringtone volume, call filtering, call forwarding, a delayed or downgraded message notification, and the like. Various settings for various parameters can be set according to the selected profile category. For example, if profile selection module 122 determines that a meeting profile is suitable based on the received data, ringtone and message notification volume can be decreased, calls may be forwarded directly to voicemail, and a vibratory alert can be substituted for an audible notification. As another example, if profile selection module 122 determines that a transportation profile is suitable based on the received data (e.g., the user and the mobile device are travelling at a speed that can be associated with a car, bus, or public transportation system), ringtone and message notification volume can be increased, calls may ring longer before they are sent to voicemail, and a vibratory alert can be increased in strength.

In various embodiments, a profile category and/or one or more profile parameters determined based on the received data can be modified by a user. For example, a default setting of profile parameters for a profile or the profile category can be overridden by a user, such as through a user's interactions with the user interface. In some embodiments, a user can save a customized setting of various profile parameters for one or more profile categories to be used in place of the default profile parameter settings.

In various embodiments, the profile selection module can include a learning mode to enable the profile selection module to receive feedback from a user and enhance the decisions made by profile selection module. An example method for self-learning is provided in FIG. 4.

Figure 4:
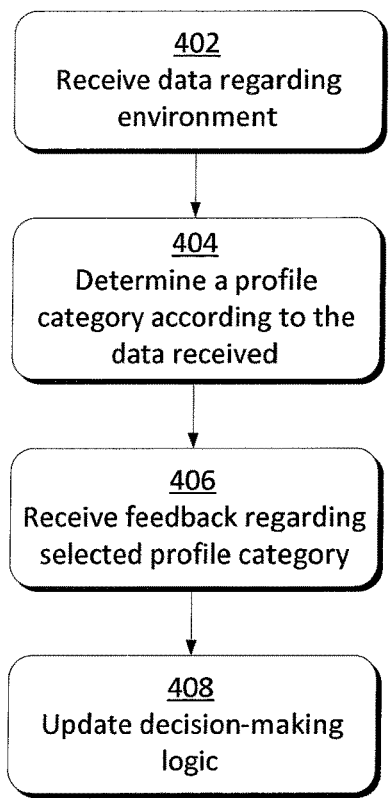
FIG. 4 depicts an example method for employing feedback obtained from a user to enhance determination of a profile category in accordance with one or more embodiments.

In FIG. 4, an example method 400 for employing feedback obtained from a user to enhance determination of a profile category in accordance with various embodiments is depicted. The method can be implemented in connection with any suitable hardware, software, firmware, or combination thereof. In at least some embodiments, the process can be implemented in software. For example, the method can be implemented by profile selection module 122.

Block 402 receives data regarding an environment in which the mobile device is present. This can be performed in any suitable way. For example, profile selection module 122 can receive information from various hardware sensors (e.g., thermometer 104, GPS receiver 106, accelerometer 108, barometer 110, ambient light sensor 112, camera 114 and microphone 116), local device data, and/or remote data available via a network connection. Local device data can include, for example, information stored in an address book or contact list on the mobile device, information stored in a calendar stored on or accessible to the mobile device, information contained in email or short message (e.g., text message) mailboxes, and geographical data such as maps or lists of points of interest. In general, local device data is data received from a data source internal to the mobile device. Remote data can include, for example, data obtained from websites, blogs, social networks, positioning data (such as received information on geographic positioning using Wi-Fi® or cellular tower triangulation), geographical information (e.g., maps, roads and railways database information, and/or public transportation schedules and routes), and the like. In general, remote data is data received from a data source external to the mobile device.

Next, block 404 determines a profile category according to the data received by block 402. This can be performed in any suitable way. For example, profile selection module 122 can input the received data into a decision-making algorithm or use a decision tree to determine a profile category for an environment in which the device is presumed to be. In some embodiments, data received can be weighted according to its relative importance with respect to other received data. For example, data that is more personal to a user or device can be weighted so as to reflect a greater importance of that data as compared to data obtained from a social network.

As above, profile categories can vary depending on the particular embodiment. For example, in some embodiments there may be three or four profile categories, while other embodiments may have more profile categories each associated with various parameter configurations.

Block 406 receives feedback regarding the selected profile category. This can be performed in any suitable way. For example, after determining a profile category, profile selection module 122 can cause one or more questions to be provided to a user of the mobile device. As an example, if the profile selection module 122 has determined based on the received data that the device is likely to be in a car, on a bus, or on another means of transportation, the profile selection module 122 can cause the display to present the user with a question such as "would you like your device to be put in transportation mode?" or the like. The user can indicate that the determination of the profile selection module 122 is correct (e.g., a "yes" response to the question) or may indicate that the determination of the profile selection module 122 is incorrect (e.g., a no response to the question). In various embodiments, the user can provide feedback in other ways, such as by manually overriding the selection of the profile selection module 122 or by selecting a profile category from a plurality of profile categories suggested by the profile selection module 122.

Finally, block 408 updates decision-making logic according to the feedback received by block 406. This can be performed in any suitable way. For example, a decision-making algorithm or decision tree can be updated according to the feedback received from a user.

In various embodiments, employing feedback obtained from a user to enhance determination of a profile category can be performed while a learning mode is specifically engaged by a user, such as during an initial period of time with the device or when a user wishes to reconfigure or recalibrate the profile selection module 122. In some embodiments, employing feedback obtained from a user to enhance determination of a profile category can be performed automatically on a periodic schedule to enable the profile selection module 122 to remain up to date with a user's preferences and profile selection history.

Having described various techniques that employ data obtained from various sensors and sources of information on a mobile device to determine a profile to be applied to the mobile device, consider the following example implementations of one or more embodiments.

Example Implementations

In various embodiments, a particular profile category can be associated with one or more known locations. For example, in addition to a user's home and place of work, assume a user frequently visits a particular bookstore and a friend's home. Each of these locations can be stored and associated with a particular profile category. For example, the user can indicate that when at home, a default profile category should be a home profile, for example, that includes an amusing ringtone tune, a high ringtone and message notification volume, and a long amount of time that a call may ring before being sent to voicemail. The user may also indicate that when at work, a default profile category should be a meeting profile in which ringtone and message notification volume can be decreased, calls may be forwarded directly to voicemail, and a vibratory alert can be substituted for an audible notification. Other default profile categories can be associated with each of the other stored locations (e.g., the bookstore and friend's home). In various embodiments, when the profile selection module receives data indicating that the device is in one of these locations, the profile selection module can select the default profile category associated with that location and apply the appropriate profile parameters for the profile category.

In embodiments in which a particular profile category is associated with a known location, the location can be detected in any suitable way. For example, a positioning system, such as satellite GPS or cell tower triangulation, can be used to determine that a current position of the device matches a known location. As another example, a Bluetooth®, NFC or Wi-Fi device that is associated with one of the known locations can be detected (e.g., a printer at work, the hotspot of a restaurant, or the like). A location can also be detected when a camera associated with the device is used to scan a visual indicator, such as a barcode.

In various embodiments, a particular profile category can be associated with a motion detection of the device. For example, assume a user is walking on a sidewalk from a first location to a second location. The profile selection module, using data received from various device sensors, can determine that the user is walking, rather than driving or biking. This can be performed in any suitable way. For example, the accelerometer can provide relative move and speed data exhibiting a repetitive pattern compatible with a walking pace. As another example, the positioning system can return data in the form of values of speed within a pre-defined range consistent with walking. In some embodiments, the profile selection module can compare speed information with information regarding a user's average walking speed. Information regarding the user's average walking speed can be obtained through device calculations, can be input by a user, or can otherwise be made known to the device and the profile selection module. In still another example, the profile selection module can combine data obtained from the positioning system with data obtained from a geographical information database to determine that the path of the user is most compatible with a walking path or sidewalk rather than a road.

In some embodiments, responsive to detecting that the user is walking, the profile selection module can obtain additional information to further customize the profile parameters associated with the profile category (e.g., the walking profile). For example, profile selection module 122 can receive data from microphone 116, evaluate the ambient noise level, and adjust the ringtone volume and/or vibration strength according to the ambient noise level. As another example, the profile selection module can employ data regarding an average noise level at the user's location obtained from an online database. In some embodiments, the average noise level for the location can be associated with a particular time of day, day of the week, or the like.

In addition to walking detection, various embodiments enable the profile selection module to detect transportation by vehicle. For example, assume that a user's primary vehicle is equipped with short-range network equipment, such as a Bluetooth® hands-free kit or a NFC tag. The profile selection module can receive data indicating that the device is within range of the known network of the vehicle, identify it as being associated with the user's primary vehicle, and apply appropriate profile parameters. For example, assuming that when a user is in the primary vehicle, the user is driving, profile parameters can forward calls to voicemail, reject chat requests, and cause short messages or notifications to be read using a text-to-speech converter to enable the user to safely receive notifications.

In some embodiments, when the profile selection module detects a vehicle network for a vehicle that is unknown or is not the user's primary vehicle, the profile selection module may presume that the user is a passenger in the vehicle and can cause notification sounds and ringtones to be played at an increased volume. Because the user is presumed to be a passenger in the vehicle, the profile selection module can assume that the user can be available for interactive communication while in the vehicle.

In still other embodiments, when the profile selection module detects a vehicle network for a vehicle that is unknown or is not the user's primary vehicle, the profile selection module can receive additional data, such as from a travel-related executable module, calendar or a confirmation email in the user's email inbox, to indicate that the user has a reservation for a vehicle rental on that date. Responsive to receiving this data and recognizing an unknown vehicle network, the profile selection module can determine that the vehicle in proximity of the user is the rental vehicle, presume that the user is user is driving, and apply profile parameters such as forwarding calls to voicemail, rejecting chat requests, and causing short messages or notifications to be read using a text-to-speech converter.

In some embodiments, the profile selection module can receive data from a positioning system associated with mobile device and data from an online geographical data repository. In these embodiments, the profile selection module can determine that the itinerary followed by the mobile device over a particular period of time, for example, the last three or five minutes, substantially matches a public transportation route. The profile selection module can also determine, for example, that the speed variations are compatible with a list of fixed stops published by the transportation company. Responsive to making this determination, the profile selection module can determine that the user is utilizing public transportation and apply an appropriate profile category. For example, the profile selection module can assume that the user can be available for interactive communication during travel via public transportation, and can apply corresponding parameters. In some embodiments, a public transportation profile can include profile parameters that enable a user to receive notifications in a manner that may not be disruptive to other passengers (e.g., vibratory or visual notifications rather than loud audible notifications).

In various embodiments, a particular profile category can be associated with meeting detection. For example, when a user is in a meeting, the meeting profile category can cause profile parameters that forward incoming calls to voicemail and provide discrete notifications for emails, short messages, and/or chat requests to be applied. In various embodiments, the profile selection module can receive data from a user's calendar and determine that the user is in a meeting. However, if the meeting starts late or the user decides to skip the meeting without updating the calendar, the selection of the meeting profile category can be inappropriate. Therefore, in various embodiments, the profile selection module can also detect a location, as described in detail above, and, responsive to determining that the detected location corresponds with the location of the meeting (e.g., as indicated on the calendar appointment), determine that the user has entered the meeting.

In some embodiments, the profile selection module can receive data indicating that the user is within range of other meeting participants and can use this data to determine that the user has entered the meeting. For example, assume a user has associated one or more other meeting participants with a Bluetooth® or NFC identification, such as within a local or remote address book or contact list. When the profile selection module receives data indicating that another meeting participant is in close proximity, it can determine that the user has entered the meeting and apply the appropriate profile parameters. In some embodiments, the profile selection module can determine that the user has entered the meeting responsive to detecting more than one other meeting participant in close proximity to the user.

In still other embodiments, the profile selection module can receive data from one or more social networks indicating that the user is within range of other meeting participants and can use this data to determine that the user has entered the meeting. For example, assume a user has shared a location on a social network and that the user is connected to other meeting participants through the social network that have also shared the location. When the profile selection module receives data indicating the meeting participants are in the same location or a location close to one another, it can determine that the user has entered the meeting and apply the appropriate profile parameters. In some embodiments, the profile selection module can determine that the user has entered the meeting responsive to detecting more than one other meeting participant in close proximity to the user.

Figure 5:
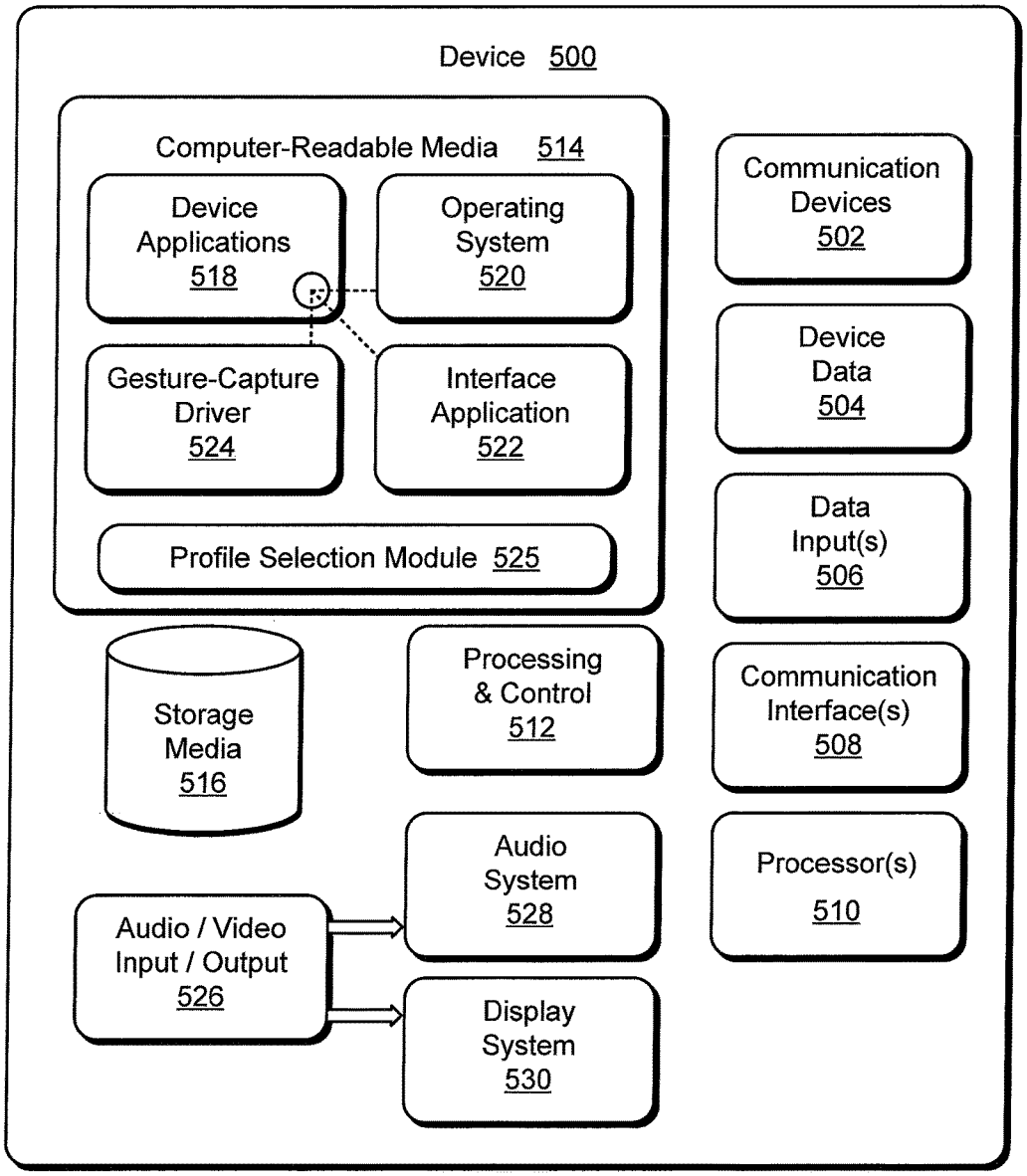
FIG. 5 is a block diagram of an example device that can be used to implement one or more embodiments.

In various embodiments, a particular profile category can be associated with detection of a "quiet place." Quiet places can include locations such as movie theaters, hospitals, or other locations that commonly prohibit audible ringtones and/or the use of mobile communication devices. In various embodiments, such locations can be tagged with NFC tags, RFID tags, and/or Bluetooth® emitters configured to transmit predefined information regarding the mobile device policy and/or a request that mobile devices select a compliant usage profile. Responsive to receiving a request, the profile selection module can select a profile category that complies with the policy and/or request and apply the associated profile parameters. In various embodiments, other locations (e.g., not just quiet places) can be configured to transmit information regarding their mobile device policies and/or requests for the selection of a compliant usage profile. For example, a policy transmitted from an airplane can Example Device FIG. 5 illustrates various components of an example device 500 that can be implemented as any type of portable and/or computer device as described with reference to FIGS. 1 and 2 to implement embodiments of the animation library described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable or readable instructions to control the operation of device 500 and to implement the embodiments described above. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 518 also include any system components or modules to implement embodiments of the techniques described herein. In this example, the device applications 518 include an interface application 522 and a gesture-capture driver 524 that are shown as software modules and/or computer applications. The gesture-capture driver 524 is representative of software that is used to provide an interface with a device configured to capture a gesture, such as a touchscreen, track pad, camera, and so on. Alternatively or in addition, the interface application 522 and the gesture-capture driver 524 can be implemented as hardware, software, firmware, or any combination thereof. In addition, computer-readable media 514 can include a profile selection module 525 that functions as described above.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A mobile device comprising:
   one or more processors; and
   one or more computer-readable storage media storing instructions that are executable by the one or more processors to perform operations including:
      receiving data regarding an environment of the mobile device including sensor data from one or more sensors of the mobile device and remote data from a data source;
      ascertaining, from the device sensor data, data indicating a walking movement type data indicating a current location of the mobile device;
      ascertaining, based on the remote data, a geographic feature for the current location of the mobile device, wherein the geographic feature is a walking path;
      selecting a profile category for the mobile device based on the geographic feature and the walking movement type; and
      applying the profile category to increase a ringtone volume on the mobile device.

2. The mobile device of claim 1, wherein determining the movement type is walking is based on a determination that the movement type is one of a human activity movement type or a machine movement type.

3. The mobile device of claim 1, wherein the data indicating the type of movement is received from an accelerometer and indicates relative move and speed data exhibiting a repetitive pattern compatible with a walking pace.

4. The mobile device of claim 1, wherein the data indicating the type of movement is in the form of a value of a speed within a pre-defined range consistent with walking.

5. The mobile device of claim 1, wherein the operations further comprise comparing speed information with information regarding an average walking speed for a user.

6. The mobile device of claim 1, wherein applying the profile category also alters one or more of a ringtone tune, call filtering, call forwarding, or a message notification setting.

7. The mobile device of claim 1 wherein the operations further comprise:
   receiving, from a user, feedback regarding the profile category;
   updating, based on the feedback, decision-making logic for selecting profile categories for the mobile device.

8. A computer-implemented method comprising:
   receiving data regarding an environment of the mobile device including sensor data from one or more sensors of the mobile device and remote data from a data source;
   ascertaining, from the device sensor data, data indicating a walking movement type and data indicating a current location of the mobile device;
   ascertaining, based on the remote data, a geographic feature for the current location of the mobile device, wherein the geographic feature is a walking path;
   selecting a profile category for the mobile device based on the geographic feature and the walking movement type; and
   applying the profile category to increase a volume setting on the mobile device.

9. The computer-implemented method of claim 8, wherein the data indicating the walking movement type is received from an accelerometer.

10. The computer-implemented method of claim 9, wherein the data received from the accelerometer indicates relative move and speed data exhibiting a repetitive pattern compatible with a walking pace.

11. The computer-implemented method of claim 8, wherein the data indicating the walking movement type is in the form of a value of a speed within a pre-defined range consistent with walking.

12. The computer-implemented method of claim 8, wherein the operations further comprise comparing speed information with information regarding an average walking speed for a user.

13. The computer-implemented method of claim 8, wherein applying the profile category also alters one or more of a ringtone tune, a ringtone volume, call filtering, call forwarding, and a message notification setting.

14. The computer-implemented method of claim 8, wherein the method further comprises:
   receiving, from a user, feedback regarding the profile category;
   updating, based on the feedback, decision-making logic for selecting profile categories for the mobile device.

15. A computer-readable hardware device storing instructions that, when executed, perform a method comprising:
   receiving data regarding an environment of the mobile device including sensor data from one or more sensors of the mobile device and remote data from a data source;
   ascertaining, from the device sensor data, data indicating a walking movement type and data indicating a current location of the mobile device;
   ascertaining, based on the remote data, a geographic feature for the current location of the mobile device, wherein the geographic feature is a walking path;
   selecting a profile category for the mobile device based on the geographic feature and the walking movement type; and
   applying the profile category to alter one or more of a ringtone tune, a ringtone volume, call filtering, call forwarding, and a message notification setting on the mobile device.

16. The computer-readable hardware device of claim 15, wherein the data indicating the walking movement type is received from an accelerometer.

17. The computer-readable hardware device of claim 16, wherein the data received from the accelerometer indicates relative move and speed data exhibiting a repetitive pattern compatible with a walking pace.

18. The computer-readable hardware device of claim 15, wherein the data indicating the walking movement type is in the form of a value of a speed within a pre-defined range consistent with walking.

19. The computer-readable hardware device of claim 15, wherein the method further comprises comparing speed information with information regarding an average walking speed for a user.

20. The computer-readable hardware device of claim 15, wherein applying the profile category.

* * * * *